United States Patent [19]

Hatori et al.

[11] Patent Number: 5,083,856
[45] Date of Patent: Jan. 28, 1992

[54] WAVEGUIDE-TYPE ACOUSTOOPTIC DEVICE

[75] Inventors: Masami Hatori; Hiroshi Sunagawa, both of Kanagawa, Japan

[73] Assignee: Fuji Photo Film Co., Ltd., Kanagawa, Japan

[21] Appl. No.: 587,912

[22] Filed: Sep. 25, 1990

[30] Foreign Application Priority Data

Sep. 25, 1989 [JP] Japan .................. 1-248490
Apr. 18, 1990 [JP] Japan .................. 2-102021

[51] Int. Cl.⁵ .................. G02F 1/11; G02B 6/10
[52] U.S. Cl. .................. 385/7; 359/305; 359/285; 385/1
[58] Field of Search .................. 350/96.13, 96.14, 358

[56] References Cited

U.S. PATENT DOCUMENTS 3,822,929 7/1974 Heidrich et al. .................. 350/358
3,951,509 4/1976 Noguchi et al. .................. 350/3.65
3,953,107 4/1976 Yano et al. .................. 350/358
4,900,113 2/1990 Hatori .................. 350/96.13

FOREIGN PATENT DOCUMENTS 61-183626 8/1986 Japan .

Primary Examiner—Eugene R. LaRoche
Assistant Examiner—Evelyn A. Lester
Attorney, Agent, or Firm—Sughrue, Mion, Zinn, Macpeak & Seas

[57] ABSTRACT

A light beam is introduced into an optical waveguide on a substrate of $LiNbO_3$, and diffracted by a surface elastic wave generated by a tilted-finger chirped interdigital transducer on the optical waveguide. The direction in which the light beam is guided through the optical waveguide is substantially aligned with the z-axis of the $LiNbO_3$ substrate. The light beam diffracted by the surface elastic wave and emitted out of the optical waveguide is applied to an optical member, such as a polarizing plate, a pinhole plate, or a light shield plate, which passes only a linear polarized component of the diffracted light beam.

4 Claims, 4 Drawing Sheets

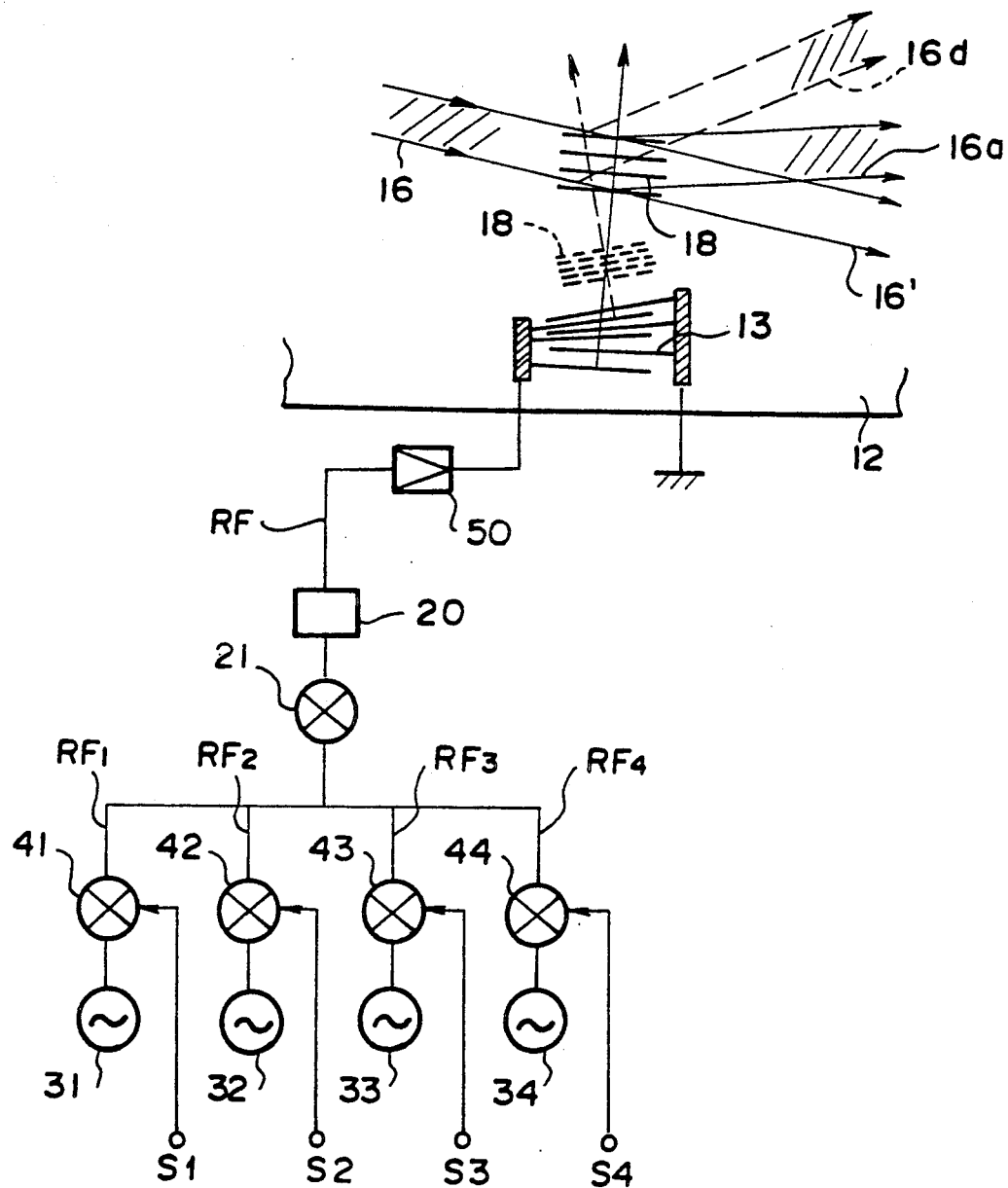

WAVEGUIDE-TYPE ACOUSTOOPTIC DEVICE

BACKGROUND OF THE INVENTION

1. Field of the Invention

The present invention relates to a waveguide-type acoustooptic device for guiding a light beam through an optical waveguide and diffracting the guided light beam with a surface elastic wave, and more particularly to a waveguide-type acoustooptic device which is prevented from suffering optical damage.

2. Description of the Prior Art

There is known an optical-waveguide-type light deflector as disclosed in Japanese Unexamined Patent Publication No. 61(1986)-183626, for example. The disclosed light deflector includes an optical waveguide made of a material which can propagate a surface elastic wave therethrough. A light beam which is guided through the optical waveguide is subjected to Bragg diffraction by a surface elastic wave which is generated in a direction transverse to the guided light beam. The angle through which the guided light beam is diffracted, i.e., the deflection angle, can continuously vary when the frequency of the surface elastic wave continuously varies.

A light spectrum analyzer, which has also been proposed heretofore as disclosed in U.S. Pat. No. 4,900,113, for example, similarly employs an optical waveguide for guiding a light beam. The guided light beam is diffracted by a surface elastic wave whose frequency is continuously changed. The wavelength of the guided light beam is measured on the basis of the frequency of the surface elastic wave when the diffraction of the light beam takes place.

According to another proposed light modulator as disclosed in U.S. Pat. Application Ser. No. 288,837, for example, a light beam guided through an optical waveguide is diffracted by a surface elastic wave. When the surface elastic wave is turned on and off, or intermittently generated, the diffracted light beam is also turned on and off, i.e., modulated by the surface elastic wave.

Each of the light deflector, the light spectrum analyzer, and the light modulator, as described above, is a waveguide-type acoustooptic device for diffracting a light beam guided through an optical waveguide, with a surface acoustic wave. Heretofore, $LiNbO_3$ is widely used as the material of the substrate of the optical waveguide.

However, waveguide-type acoustooptic devices which have substrates of $LiNbO_3$ are susceptible to optical damage. Optical damage, which is caused to an optical waveguide, tends to disturb the profile of a light wave or block the guiding of light when a highly intensive light beam is introduced into the optical waveguide. Therefore, the conventional waveguide-type acoustooptic devices with $LiNbO_3$ substrates have been difficult to guide a highly intensive light beam. Particularly, the light modulator, referred to above, generally guides a light beam whose width has been reduced to a very small value, in order to increase the rate of modulation, i.e., shorten the time required for the surface acoustic wave to travel across the guided light beam. The optical waveguide of the light modulator is more liable to suffer optical damage because the reduced-width light beam applies intensified light energy to the optical waveguide.

It is known that an optical waveguide comprising an $LiNbO_3$ substrate is less subject to optical damage if an introduced light beam is guided in the direction of a z-axis of the $LiNbO_3$ crystal.

With the light beam guided in the z-axis direction, however, since effective refractive indexes for TE and TM modes are substantially the same as each other, when the light beam is introduced in the TE mode, it is diffracted without any mode conversion, namely, simply from the TE mode to the TE mode, and also with a mode conversion from the TE mode to the TM mode, a phenomenon referred to as the TE-TM mode conversion diffraction. Likewise, when the light beam is introduced in the TM mode, it is diffracted without any mode conversion, namely, simply from the TM mode to the TM mode, and also with a mode conversion from the TM mode to the TE mode. Therefore, the diffracted light beam is propagated in both TE and TM modes irrespective of the mode in which the light beam is introduced into the optical waveguide.

One way of emitting a light beam, which has been guided through an optical waveguide, out of the optical waveguide is to use a grating coupler on the surface of the optical waveguide for diffracting the guided light beam. A light beam which is guided in both TE and TM modes through the optical waveguide is diffracted through slightly different angles by such a grating coupler. Therefore, two light beams which travel slightly displaced light paths are emitted from the optical waveguide, and such two light beams cannot be focused into a small single spot. The two light beams thus emitted from the optical waveguide find little or no use at all.

If the diffracted light beam is directly emitted from the optical waveguide, such two light beams traveling along displaced light paths are not produced. Since, however, the light beam guided in both TM and TE modes is emitted from the optical waveguide, the emitted light beam contains components which are linearly polarized in two perpendicular directions. However, the light beam emitted from the optical waveguide should preferably be linearly polarized in only one direction in some applications. The light beam which contains two linearly polarized components, as described above, also find little or no use in such applications.

SUMMARY OF THE INVENTION

In view of the aforesaid conventional drawbacks, it is an object of the present invention to provide a waveguide-type acoustooptic device which includes an $LiNbO_3$ substrate, is less susceptible to optical damage, and is capable of emitting a single light beam which is linearly polarized in one direction.

According to the present invention, there is provided a waveguide-type acoustooptic device comprising a substrate of $LiNbO_3$, an optical waveguide disposed on the substrate for guiding a light beam therethrough in a direction substantially aligned with a z-axis of the substrate, a means disposed on the optical waveguide, for generating a surface elastic wave to diffract the light beam guided through the optical waveguide, and an optical member, positioned such that the diffracted light beam emitted out of the optical waveguide is applied to the optical member, for passing only a linear polarized component of the diffracted light beam.

Preferably, the optical member comprises a polarizing plate. When the diffracted light beam is emitted out of the optical waveguide through a grating coupler, it is divided into light beams traveling in respective TM and TE modes along different light paths. In such a case, the optical member may be a pinhole plate or a light shield plate for passing only one of such light beams traveling along a desired one of the light paths.

The polarizing plate or the like is effective to pass only one of the light beams which have been propagated in the TM and TE modes through the optical waveguide, while cutting off the other light beam.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 2 is a schematic diagram showing a portion of the waveguide-type acoustooptic device and an electric circuit connected thereto;

DESCRIPTION OF THE PREFERRED EMBODIMENTS

Figure 1:
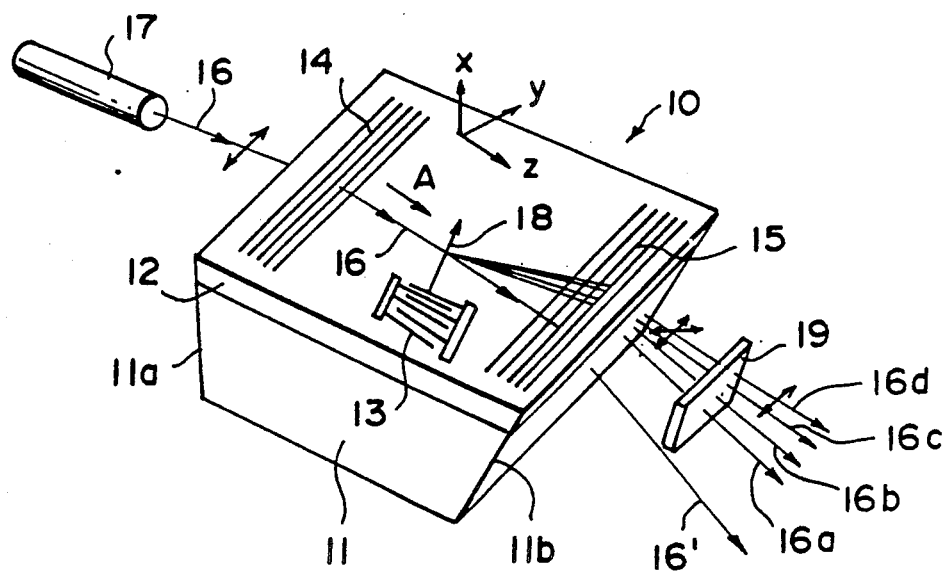
FIG. 1 is a schematic perspective view of a light modulator which incorporates a waveguide-type acoustooptic device according to an embodiment of the present invention.

FIG. 1 shows a light modulator 10 which incorporates a waveguide-type acoustooptic device according to an embodiment of the present invention. FIG. 2 shows a portion of the waveguide-type acoustooptic device, around an interdigital transducer (IDT), and an electric circuit connected to the IDT.

As shown in FIG. 1, the light modulator 10 comprises a slab-shaped optical waveguide 12 mounted on a transparent substrate 11, an IDT 13 disposed on the optical waveguide 12, a linear grating coupler (LGC) 14 for introducing a light beam into the optical waveguide 12, and a linear grating coupler (LGC) 15 for emitting a light beam out of the optical waveguide 12, the LGCs 14, 15 being disposed on the optical waveguide 12 and spaced from each other. The IDT 13 is positioned between the LGCs 14, 15. The IDT 13 is in the form of a tilted-finger chirped IDT whose electrode fingers are spaced at progressively varying intervals and oriented in progressively varying directions.

In the embodiment shown in FIG. 1, the substrate 11 comprises a wafer of $LiNbO_3$, and the optical waveguide 12 comprises a Ti-diffused film on the surface of the $LiNbO_3$ wafer. However, the optical waveguide 12 may be formed by sputtering, evaporating, or otherwise depositing another material on the substrate 11, provided such a material is capable of propagating a surface elastic wave, as with the Ti-diffused film. The optical waveguide 12 may be of a laminated structure composed of two or more films or layers.

The tilted-finger chirped IDT 13 may be formed as follows, for example: a positive electron beam resist is coated on the surface of the optical waveguide 12; an electrically conductive thin film of Au is evaporated on the positive electron beam resist; an electrode pattern is then printed with an electron beam; the thin film of Au is peeled off; the electrode pattern is developed; then thin films of Cr and Al are evaporated onto the surface formed thus far, and unnecessary layers are lifted off in an organic solution.

A light beam 16 to be modulated by the light modulator 10 is emitted by a laser source 17 which may comprise an He - Ne laser or the like. The laser source 17 is positioned with respect to the light modulator 10 such that the light beam 16, which is a parallel beam of light, passes through an obliquely cut end surface 11a of the substrate 11, travels through the optical waveguide 12, and is applied to the LGC 14. The light beam 16 which is applied to the LGC 14 is diffracted by the LGC 14, and then travels in the optical waveguide 12 in a guided mode in the direction indicated by the arrow A.

The $LiNbO_3$ substrate 11 may be of an x-cut or y-cut crystal (an x-cut crystal in the illustrated embodiment), and is oriented such that the z-axis of the crystal is aligned with the direction in which the light beam is guided, i.e., the direction indicated by the arrow A. The substrate 11 thus oriented can reduce optical damage to the optical waveguide 12 as known in the art.

As shown in FIG. 2, four parallel high-frequency oscillators 31, 32, 33, 34, for example, are connected to the tilted-finger chirped IDT 13 through an RF amplifier 50, an attenuator 20, and an adder 21. Switching circuits 41, 42, 43, 44 are connected between the adder 21 and the high-frequency oscillators 31, 32, 33, 34. The high-frequency oscillators 31, 32, 33, 34 generate high-frequency voltages $RF_1$, $RF_2$, $RF_3$, $RF_4$, respectively, having respective frequencies $f_1$, $f_2$, $f_3$, $f_4$ ($f_1 < f_2 < f_3 < f_4$). These high-frequency voltages $RF_1$, $RF_2$, $RF_3$, $RF_4$ are applied to the tilted-finger chirped IDT 13 when the respective switching circuits 41, 42, 43, 44 are closed.

When the high-frequency voltages $RF_1$, $RF_2$, $RF_3$, $RF_4$ are applied, the tilted-finger chirped IDT 13 generates surface elastic waves 18 having respective frequencies $f_1$, $f_2$, $f_3$, $f_4$. When plural ones of the high-frequency voltages $RF_1$, $RF_2$, $RF_3$, $RF_4$ are simultaneously applied to the tilted-finger chirped IDT 13, the generated surface elastic wave 18 has a frequency which is the combination of the frequencies of the applied voltages. If all the high-frequency voltages $RF_1$, $RF_2$, $RF_3$, $RF_4$ are simultaneously applied to the tilted-finger chirped IDT 13, then the generated surface elastic wave 18 has a frequency which is the combination of the frequencies $f_1$, $f_2$, $f_3 f_4$.

The tilted-finger chirped IDT 13 is arranged such that the surface elastic wave 18 generated thereby travels in a direction across the light path of the light beam 16 which is guided through the optical waveguide 12. Therefore, the light beam 16 is propagated transversely across the surface elastic wave 18, at which time the light beam 16 is Bragg-diffracted due to an acoustooptic interaction between itself and the surface elastic wave 18.

The Bragg diffraction of a guided light beam with a surface elastic wave, which is well known in the art, will briefly be described below. If it is assumed that the direction in which the surface elastic wave 18 is propagated in the optical waveguide 12 and the direction in which the light beam 16 travels in the optical waveguide 12 form an angle $\theta$ therebetween, then the angle $\delta$ of deflection of the light beam 16 due to an acoustooptic interaction between itself and the surface elastic wave 18, is $\delta = 2\theta$, which is expressed as follows:

$$2\theta = 2\sin^{-1}\{\lambda/(2Ne \cdot \Lambda)\}$$
$$\simeq \lambda/(Ne \cdot \Lambda)$$
$$= \lambda \cdot f/(Ne \cdot v)$$

where $\lambda$ is the wavelength of the light beam 16, Ne is the effective refractive index of the optical waveguide 12, and $\Lambda$, f, v are the wavelength, frequency, and speed, respectively, of the surface elastic wave 18. Thus, the diffraction angle $2\theta$ or $\delta$ is substantially proportional to the frequency f of the surface elastic wave 18. Therefore, when the high-frequency voltages $RF_1$, $RF_2$, $RF_3$, $RF_4$ are applied to the tilted-finger chirped IDT 13, diffracted light beams 16a, 16b, 16c, 16d which travel in respective different directions are produced as shown in FIG. 2. As shown in FIG. 1, these diffracted light beams 16a, 16b, 16c, 16d are diffracted, together with a zeroth-order light beam 16', by the LGC 15 and emitted out of the light modulator 10 from an obliquely cut end surface 11b of the substrate 11.

The switching circuits 41, 42, 43, 44 can be opened and closed by modulating signals S1, S2, S3, S4 which are applied respectively thereto. Therefore, the application of the high-frequency voltages $RF_1$, $RF_2$, $RF_3$, $RF_4$ to the tilted-finger chirped IDT 13 can be turned on and off by these modulating signals S1, S2, S3, S4, respectively. As a result, the components of the surface elastic wave 18 which have the respective frequencies $f_1$, $f_2$, $f_3$, $f_4$ can be turned on and off, and hence the light beams 16a, 16b, 16c, 16d can be modulated or turned on and off by the respective modulating signals S1, S2, S3, S4.

Figure 3:
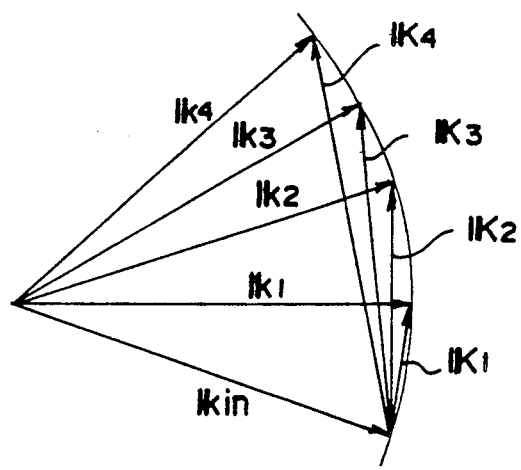
FIG. 3 is a diagram of wave vectors, illustrative of the diffraction of a light beam in the waveguide-type acoustooptic device.

The tilted-finger chirped IDT 13 is constructed such that electrode fingers at the lower end thereof in FIG. 2 excite the surface elastic wave 18 having the frequency $f_1$ (indicated by the solid lines) and electrode fingers at the upper end thereof excite the surface elastic wave 18 having the frequency $f_4$ (indicated by the broken lines). The surface elastic waves having the frequencies $f_2$, $f_3$ are excited by electrode fingers positioned between the upper and lower ends of the tilted-finger chirped IDT 13. The electrode fingers of the tilted-finger chirped IDT 13 are oriented in progressively different directions such that the surface elastic waves 18 having the frequencies $f_1$, $f_2$, $f_3$, $f_4$ diffract the light beam 16 in a substantially single location on the light path of the light beam 16 while satisfying the Bragg condition:

$$|K_{IN}+|k=|k$$

where $|k_{IN}$, $|K$, $|k$ are the wave vectors of the light beam 16 before it is diffracted, the surface elastic wave 18, and the diffracted light beam, respectively. The relationship between these wave vectors is shown in FIG. 3. In FIG. 3, $|K_1$, $|K_2$, $|K_3$, $|K_4$ represent the wave vectors of the surface elastic waves 18 having the frequencies $f_1$, $f_2$, $f_3$, $f_4$, respectively, and $|k_1$, $|k_2$, $|k_3$, $|k_4$ represent the wave vectors of the diffracted light beams 16a, 16b, 16c, 16d.

In this embodiment, the Bragg condition is satisfied between the light beam 16 and all the surface elastic waves having the frequencies $f_1$ through $f_4$. Since all the powers of the surface elastic waves 18 having the frequencies $f_1$ through $f_4$ contribute to the diffraction of the light beam 16, a high diffraction efficiency is achieved.

A polarizing plate 19 is positioned such that the diffracted light beams 16a through 16d emitted from the optical waveguide 12 are applied to the polarizing plate 19. The light beam 16 introduced into the optical waveguide 12 is linearly polarized in the direction indicated by the arrow in FIG. 1, and is guided in a TE mode through the optical waveguide 12. When the direction in which the light beam 16 is guided is aligned with the z-axis of the $LiNbO_3$ substrate 11, the light beams 16a through 16d are diffracted by the surface elastic wave 18 while traveling from the TE mode to the TE mode and also being converted from the TE mode to the TM mode. Consequently, the diffracted light beams 16a through 16d are propagated in both TE and TM modes through the optical waveguide 12. Each of the diffracted light beams 16a through 16d which are emitted out of the optical waveguide 12 contain components that are linearly polarized in mutually perpendicular directions.

Figure 4:
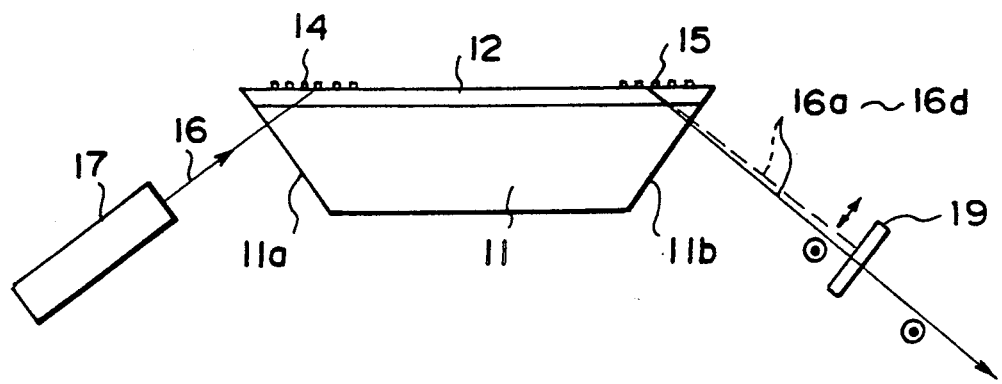
FIG. 4 is a side elevational view of the waveguide-type acoustooptic device.

As shown in FIG. 4, the light beams 16a through 16d (indicated by the solid line) which are diffracted in the TE mode in the optical waveguide 12 are diffracted through a larger angle by the LGC 15 than the diffracted light beams 16a through 16d (indicated by the broken line) which are diffracted in the TM mode in the optical waveguide 12, and then are emitted out of the optical waveguide 12. The polarizing plate 19 serves to pass only those components which are polarized in a direction normal to the sheet of FIG. 4. Therefore, the diffracted light beams 16a through 16d which are propagated in the TM mode through the optical waveguide 12 are cut off by the polarizing plate 19, and only the diffracted light beams 16a through 16d which are propagated in the TE mode through the optical waveguide 12 are allowed to pass through the polarizing plate 19.

After having passed through the polarizing plate 19, the diffracted light beams 16a through 16d travel along a single light path, rather than different light paths as is the case before passing through the polarizing plate 19, and can be focused into a small light spot. The diffracted light beams 16a through 16d which have passed through the polarizing plate 19 are linearly polarized in one direction, so that they can meet a requirement for a modulated light beam that is linearly polarized in one direction.

Figure 5:
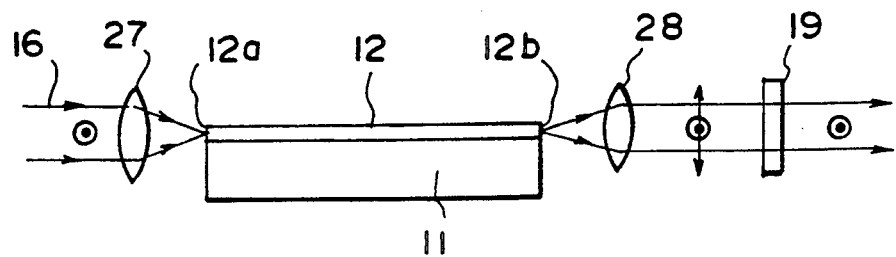
FIG. 5 is a side elevational view of a waveguide-type acoustooptic device according to another embodiment of the present invention.

The light beam 16 is introduced into the optical waveguide 12 through the LGC 14, and the light beams 16a through 16d are emitted out of the optical waveguide 12 through the LGC 15 in the above embodiment. However, as shown in FIG. 5, a light beam may be applied to an end surface 12a of the optical waveguide 12 through a cylindrical lens 27, and a diffracted light beam may be emitted from an end surface 12b of the optical waveguide 12 through a cylindrical lens 28. In the arrangement shown in FIG. 5, the polarized components of the diffracted light beams 16a through 16d do not travel through displaced light paths. The diffracted light beams 16a through 16d which are linearly polarized in only one direction can be extracted by the polarizing plate 19.

While the diffracted light beams 16a through 16d which are propagated in the TE mode through the optical waveguide 12 are allowed to pass through the polarizing plate 19 in the above embodiment, diffracted light beams propagated in the TE mode may be cut off by a polarizing plate, and only diffracted light beams propagated in the TM mode may pass through the polarizing plate.

The optical waveguide 12 may be formed by a proton exchange or annealing after a proton exchange, instead of a Ti-diffused film. In order to increase the number N of diffracted light beams or increase the rate of modulation, it is more effective to use a light beam 16 having a smaller beam width D. However, a light beam 16 having a smaller beam width D is more liable to cause optical damage to the optical waveguide 12. The optical waveguide 12 which is formed by a proton exchange or annealing after a proton exchange is less susceptible to optical damage, and hence is particularly preferable for use in the present invention. From the standpoint of minimizing optical damage, an $LiNbO_3$ substrate which is doped with MgO is preferred to an ordinary $LiNbO_3$ substrate.

A waveguide-type acoustooptic device according to still another embodiment of the present invention will be described below with reference to FIGS. 6 and 7. Those parts shown in FIGS. 6 and 7 which are identical to those parts of the waveguide-type acoustooptic device according to the previous embodiments are denoted by identical reference numerals, and will not be described in detail.

Figure 6:
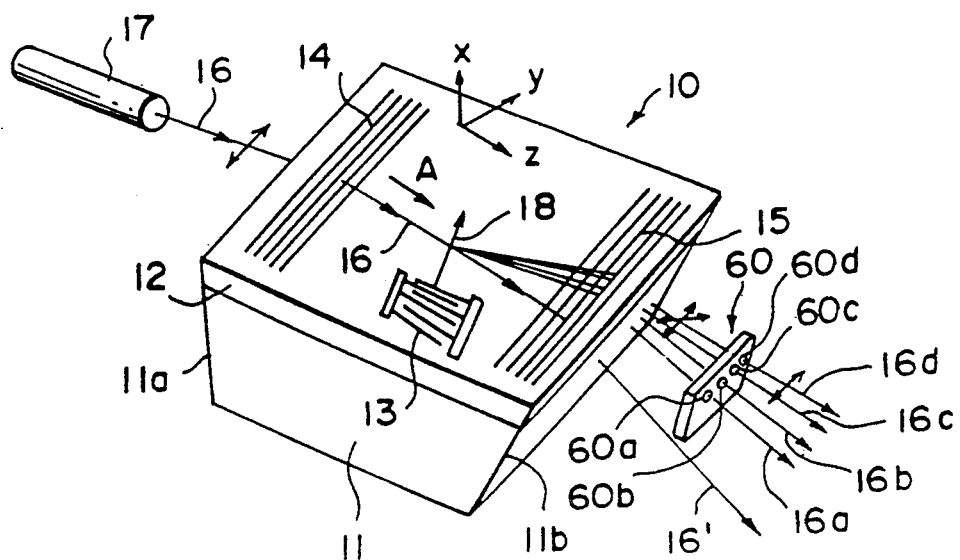
FIG. 6 is a schematic perspective view of a light modulator which incorporates a waveguide-type acoustooptic device according to still another embodiment of the present invention.
Figure 7:
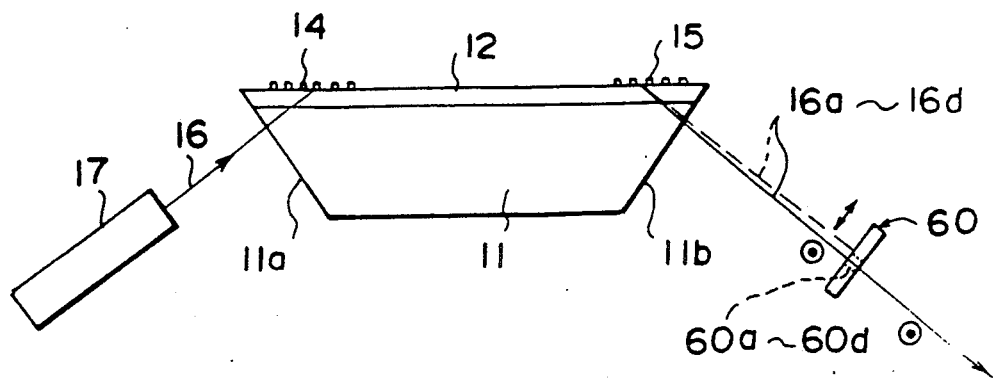
FIG. 7 is a side elevational view of the waveguide-type acoustooptic device shown in FIG. 6.

The waveguide-type acoustooptic device shown in FIGS. 6 and 7 employs a pinhole plate 60 having four pinholes 60a, 60b, 60c, 60d, in place of the polarizing plate 19 shown in FIG. 1. As shown in FIG. 7, the pinhole plate 60 is arranged such that the pinholes 60a, 60b, 60c, 60d pass diffracted light beams 16a, 16b, 16c, 16d (indicated by the solid line), respectively, which have been propagated in the TE mode, but cut off diffracted light beams 16a through 16d (indicated by the broken line) which have been propagated in the TM mode.

Figure 8:
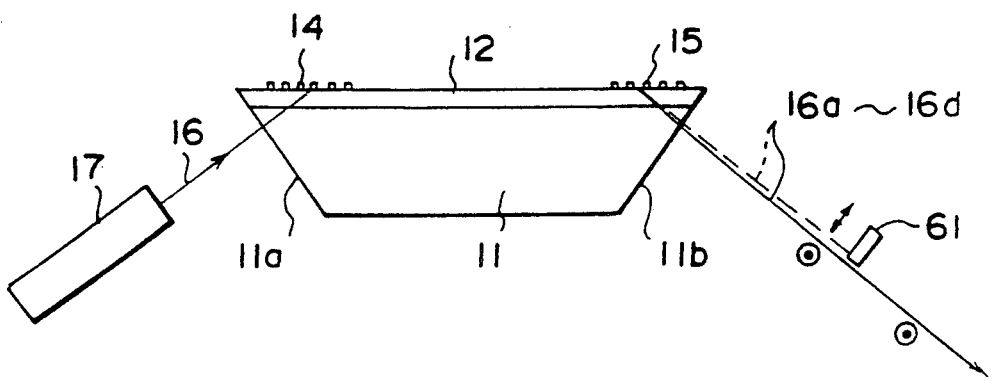
FIG. 8 is a side elevational view of a waveguide-type acoustooptic device according to yet another embodiment of the present invention.

FIG. 8 shows a waveguide-type acoustooptic device according to yet another embodiment of the present invention. Those parts shown in FIG. 8 which are identical to those parts of the waveguide-type acoustooptic device according to the previous embodiments are denoted by identical reference numerals, and will not be described in detail.

The waveguide-type acoustooptic device shown in FIG. 8 employs a light shield plate 61 in place of the polarizing plate 19 shown in FIG. 1. The light shield plate 61 is positioned out of the light path of the diffracted light beams 16a, 16b, 16c, 16d (indicated by the solid line) which have been propagated in the TE mode, but has a lower end positioned in the light path of the light beams 16a through 16d (indicated by the broken line) which have been propagated in the TM mode. Therefore, the diffracted light beams 16a through 16d which have been propagated in the TM mode are cut off by the light shield plate 61.

In the embodiments shown in FIGS. 6 through 8, the pinhole plate 60 and the light shield plate 61 may also be arranged to cut off the diffracted light beams 16a through 16d which have been propagated in the TE mode, but pass the diffracted light beams 16a through 16d which have been propagated in the TM mode.

In the waveguide-type acoustooptic devices according to the illustrated embodiments, the introduced light beam 16 is divided into a plurality of light beams. However, if the light beam 16 is diffracted by a surface elastic wave having a constant frequency, then the diffracted light beam is not divided into a plurality of light beams. The principles of the present invention are equally applicable to a waveguide-type acoustooptic device which modulates only one light beam.

Moreover, the present invention is applicable to not only a waveguide-type acoustooptic device for use in a light modulator, but also a waveguide-type acoustooptic device for use in a light deflector, a light spectrum analyzer, or the like.

With the present invention, as described above, since the direction in which a light beam is guided in an optical waveguide before it is diffracted is aligned with the z-axis of the $LiNbO_3$ substrate of the waveguide-type acoustooptic device, any optical damage to the optical waveguide can be reduced.

The diffracted light beams which have been emitted out of the optical waveguide are applied to an optical member such as a polarizing plate, a pinhole plate, or the like, which extracts only certain polarized components of the diffracted light beams. The diffracted light beams which have been propagated in different modes through the optical waveguide, which different modes are present owing to the alignment of the direction in which the light beams are guided with the z-axis of the substrate, can be selectively extracted by the optical member. As a consequence, the waveguide-type acoustooptic device according to the present invention can be used in a wide variety of applications.

Although certain preferred embodiments have been shown and described, it should be understood that many changes and modifications may be made therein without departing from the scope of the appended claims.

We claim:
1. A waveguide-type acoustooptic device comprising:
   i) a substrate of $LiNbO_3$;
   ii) an optical waveguide disposed on said substrate for guiding a light beam therethrough in a direction substantially aligned with a z-axis of said substrate;
   iii) means disposed on said optical waveguide, for generating a surface elastic wave to diffract said light beam guided through the optical waveguide so as to produce a first diffracted light beam having a first mode and a second diffracted light beam having a second mode; and
   iv) an optical member, positioned such that at least one of said first and second diffracted light beams emitted out of said optical waveguide is applied to the optical member, for passing only linear polarized component of the diffracted light beam.

2. A waveguide-type acoustooptic device according to claim 1, wherein said optical member comprises a polarizing plate.

3. A waveguide-type acoustooptic device according to claim 1, wherein said optical member comprises a pinhole plate having at least one pinhole.

4. A waveguide-type acoustooptic device according to claim 1, wherein said optical member comprises a light shield plate.

* * * * *